H. M. House,
Hinge.

Nº 47,726.      Patented May 16, 1865.

Witnesses:
Edw. F. Brown,
J. B. Woodruff

Inventor:
Henry M. House

UNITED STATES PATENT OFFICE.

HENRY M. HOUSE, OF WASHINGTON, DISTRICT OF COLUMBIA.

IMPROVEMENT IN MOVABLE JOINT FOR TABLES, &c.

Specification forming part of Letters Patent No. 47,726, dated May 16, 1865.

*To all whom it may concern:*

Be it known that I, HENRY M. HOUSE, of the county and city of Washington, in the District of Columbia, have invented a new and useful improvement in a movable joint-fastener for extension-tables, wardrobes, bedsteads, billiard-tables, bench-frames, lathes, and all kinds of machinery and furniture which is desirable to take in pieces for moving or transportation; and the following is a full, clear, and exact description of the same, reference being had to the accompanying drawings, making a part of this specification, in which—

Figure 1:
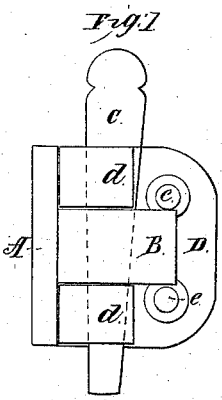
Figure 2:
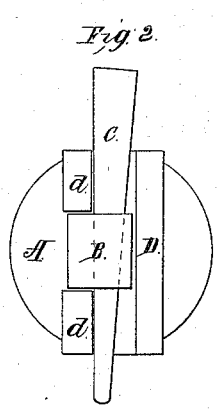
Figure 2:
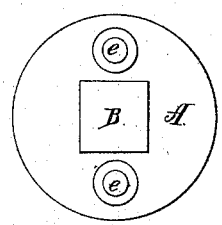
Figure 2:
Figure 2:
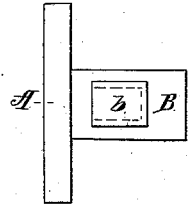
Figure 3:
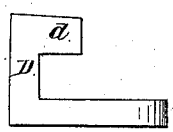
Figure 3:
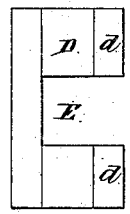

Figure 1 represents a side view of all the parts of the coupling as they are attached together. Fig. 2 shows the end view of the coupling. Fig. 3 is the coupling or joint-fastener detached or in separate pieces.

My invention consists in the arrangement and combination of a plate with a mortised stud attached, a hooked flange, and a tapering key which may be attached to any place and in any position, (it being both right and left,) where it is desirable to have a firm and substantial fastening for joints, which can be instantly liberated.

To enable others skilled in the art to make and use my invention, I will proceed to describe it more fully, referring to the drawings, and to the letters of reference marked thereon.

The plate A may be square or round, so as to be easily let into and fitted to a bed-post or any other place.

The post or stud B is made square and cast or wrought in the center. On one side of the plate A, through the stud B, is an opening or an oblong square tapering mortise, b, into which the tapering key C is fitted.

The hooked flange D is wrought or made of cast malleable iron, brass, or any other tough metal, one side being solid, with the exception of two or more screw-holes, e e, by which it is secured to the rail or piece, to be held to another. There are two hooks, d d, forming right angles and a parallel (—) with the face side of the flange.

The open space E between the hooks d d is made to admit the stud B, which should be closely fitted, so as not to have play or move up or down in the space E, the mortise b in the post or stud B being in such a position with the hooks d d of the flange that when the key C is inserted in the mortise b the bearing will be equal upon two sides of both the hooks d d and the mortise b, and thereby force the stud B against the plate of the flange D and the flange against the plate A, so that the key C, being slightly tightened, there is no possibility of the joint being moved while the key is in its place.

When it is desirable to take a piece of machinery, or a frame, or furniture of any kind to pieces that is secured by my mode of fastening, all that is necessary to be done is to start back the key C, which can readily be done with a light tap of the hammer, and all is ready for removal; and the advantages of putting up are also equally great, the parts being placed in position, the keys stuck in their places, they will work in and become tight by their own gravity, or a very light blow upon the key makes the joint fast.

Having thus fully described my invention, what I claim as new, and desire to secure by Letters Patent, is—

The combination and arrangement of the parts, which consists of the plate A, with the mortised stud B attached, a hooked flange, D, and a tapering key, C, the same being applicable for fastening all movable joints in the manner described, for the purposes herein set forth.

HENRY M. HOUSE.

Witnesses:
 EDM. F. BROWN,
 J. B. WOODRUFF.